D. C. COOK.
DIRECTION INDICATOR FOR AUTOMOBILES.
APPLICATION FILED JAN. 15, 1917.
1,269,261. Patented June 11, 1918.
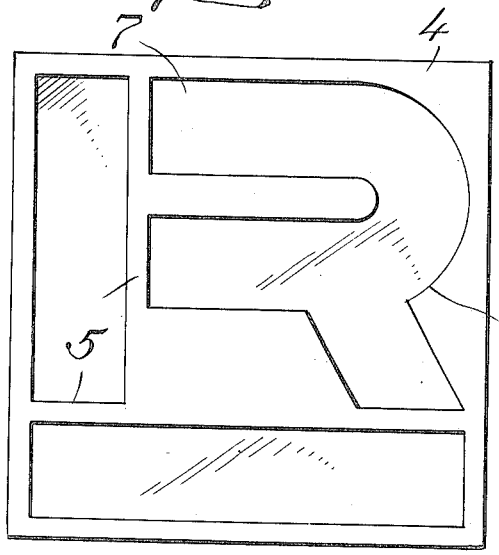
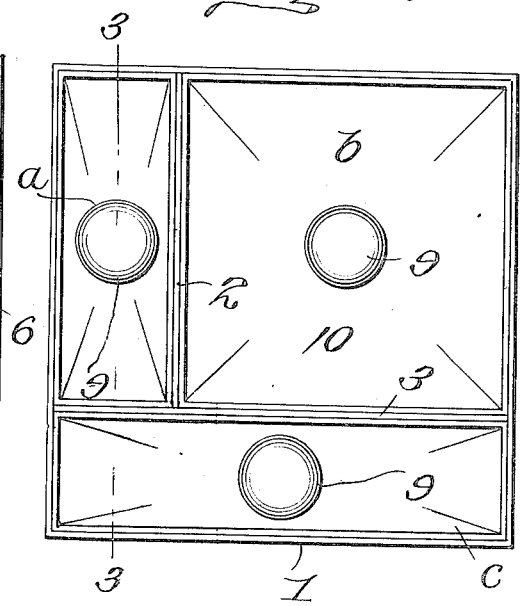
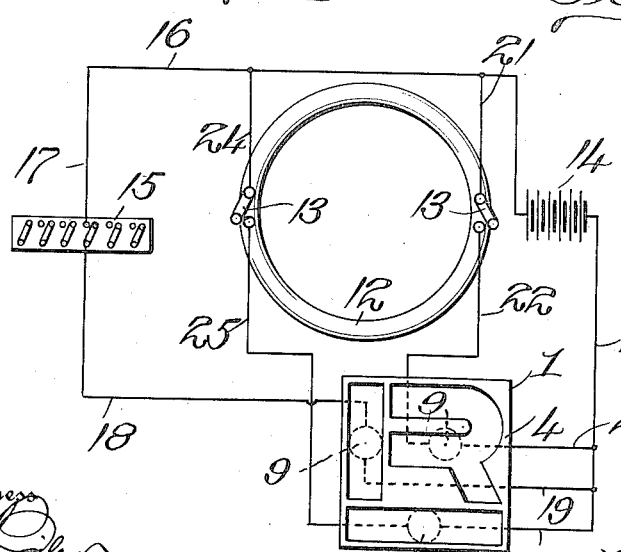
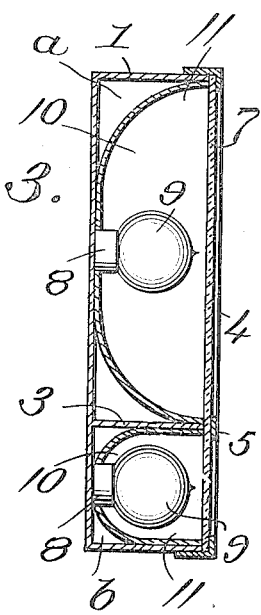
Inventor
D. C. Cook,
Attorneys

UNITED STATES PATENT OFFICE.

DWIGHT C. COOK, OF PHILADELPHIA, PENNSYLVANIA.

DIRECTION-INDICATOR FOR AUTOMOBILES.

1,269,261.　　　　　　Specification of Letters Patent.　　Patented June 11, 1918.

Application filed January 15, 1917. Serial No. 142,460.

*To all whom it may concern:*

Be it known that I, DWIGHT C. COOK, a citizen of the United States, residing at Philadelphia, in the county of Philadelphia, State of Pennsylvania, have invented certain new and useful Improvements in Direction-Indicators for Automobiles; and I do hereby declare the following to be a full, clear, and exact description of the invention, such as will enable others skilled in the art to which it appertains to make and use the same.

This invention relates to direction indicators for automobiles.

The object of the invention is to provide a signal device for use in connection with the electric system of automobiles whereby machines traveling in the rear of the automobile carrying the signal of my invention may be notified of the changes in direction contemplated by the driver of the automobile. Furthermore, in this connection, it is the object of the invention to provide such a signal in an operating system which may be controlled from the steering wheel in such a manner as to greatly preclude chances of error on the part of the driver in making the signal.

It is furthermore an object to provide a signaling device for attachment to the rear end of an automobile which combines the functions of a tail light and direction indicator, and more particularly comprises a casing which is sub-divided into illuminated compartments, one of which is constantly illuminated to act as a tail light, while the remaining compartments are illuminated in turn and are so conformed that each, when illuminated, forms with the constantly lighted tail light compartment, an index to the direction in which the driver will steer the automobile.

With the above objects in view, and such others as may hereinafter appear, my invention will now be fully set forth and described, reference being had to the accompanying drawings.

In the drawings:—

Figure 1 is a front elevation of the signal device,

Fig. 2 is an elevation thereof with the cover portion removed,

Fig. 3 is a section on line 3—3 of Fig. 2, and

Fig. 4 is a diagram showing that portion of the electric system of an automobile which includes the signal device of my invention.

Referring more particularly to the drawings, 1 indicates a suitable casing which is preferably formed of sheet metal, and has such dimensions as will permit the sub-division of the casing into compartments $a$, $b$, and $c$. The compartments $a$ and $c$ are of the same width, or substantially so, and together form from the outline of the "letter L." The compartment $c$ extends clear across the bottom of the casing 1, and the compartment $a$ extends vertically along the left side of the casing and terminates at the left end of the compartment $c$. The compartment $b$ comprises the remaining portions of the casing 1, and is proportioned to permit the formation in its cover portion of the rounded portion and the short leg of the "letter R," these combining with the cover portion of the compartment $a$ to form the "letter R." The cover plate 4 consists of a frame portion which is shaped and flanged to fit over the edge of the casing 1, and has, furthermore, vertical and transverse strips 5 adapted to overlie the partition plates 2 and 3. In addition to the above, the outline portion 6 is provided between and joined to the adjacent portions of the strips 5 to provide for the letter R. A glass plate 7 of suitable color is provided between the cover plate 4 and the edge of the casing 1 in order to protect the interiors of the compartments and to display a tail light of the proper color. Suitably disposed within each of the compartments $a$, $b$ and $c$ is a lamp socket 8 having the lamps 9 which are wired in accordance with the system hereinafter outlined. Lining each of the compartments and disposed behind the lamps 9 are the reflectors 10 which are preferably metallic plates suitably coated to provide reflecting surfaces, and being of such length that their ends may be upturned as at 11 to shape the reflectors into the compartments in such manner that the rays of light from the lamps will be thoroughly reflected through the cover plate.

The signal device of this invention is preferably controlled from the steering wheel 12 of the machine, by means of switches 13, one of the switches 13 being located upon each transverse side of the steering wheel 12 by being embedded in the body of the steering wheel rim so that the actuating button or handle lies in position to be manipulated without appreciable extra movement of the hand by the operator. Following an obvious practical scheme, the switch 13 at the left side of the wheel would be operated to signal a turn to the left and an operation of the right hand switch would signal a turn to the driver's right. The signal may be furnished with current from the usual power source 14, whether it be a storage battery, a dynamo, or other current source, or, the intermittently employed signal lights may be supplied with current from an independent current source. In the system indicated in Fig. 4, the light in compartment *a* is wired to perform the function of the tail light and, in order that it may be lighted with the rest of the normal lighting systems, is shown controlled from the dash board, switch board of the machine, its circuit including the wire 16, branch 17, switch 15, wire 18 compartment *a*, wire 19, and return wire 20. The light in compartment *b* is shown connected to the right hand switch 13, its circuit including the wire 16, branch 21, right hand switch 13, wire 22, the lamp, wire 23 and return wire 20. The lamp in compartment *c* is shown connected to the left hand switch 13 and includes in its circuit, the wire 16, branch 24, the switch, wire 25, the lamp, wire 26 and return wire 20.

It will be obvious from the foregoing that I have provided a practical and extremely simply arranged signaling device for the rear ends of automobiles, the device comprising at once a tail light and a direction signal, its compactness being further enhanced by the fact that the tail light is used in each case in the formation of the index for expressing the design of the driver. In its operation, the compartment *a* of the device is illuminated by a light which is constantly lighted throughout the light period, and is lighted in the regular course from the usual dash board switches. The other compartments *b* and *c* may be alternately illuminated from the switches 13 on the steering wheel, and when the former is lighted, the displayed illumination forms with the illumination of the compartment *a*, the letter "R," and when the light in compartment *b* is extinguished and the light in compartment *c* is illuminated, the combination of *a* and *c* forms the letter "L," which, of course indicates a turn to the left.

What I claim as my invention is:—

1. In an automobile illuminating and direction signal, a rectangular casing sub-divided into a plurality of compartments, and a cover plate for the casing having outlined characters constituting index elements, one of said compartments being constantly illuminated to provide a tail light and the other compartments being adapted to be alternately lighted and forming, when lighted, in combination with the outline of the tail light compartment, a letter which is the initial one of the direction.

2. In an automobile illuminating and direction signal, a casing sub-divided into a plurality of compartments, one of said compartments being constantly illuminated to provide a tail light, and the other compartments when singly illuminated forming with the tail light compartment a direction index, each of said compartments having a reflector which curves from the center toward the upper edges of the sides of the compartment.

In testimony whereof, I affix my signature, in the presence of two witnesses.

DWIGHT C. COOK.

Witnesses:
JULIA H. HOLLINGS,
ROBERT H. BAILEY.